G. F. LONG.
FLEXIBLE SHAFT.
APPLICATION FILED MAY 19, 1914.

1,192,914.

Patented Aug. 1, 1916.

WITNESSES
Geo. F. Schwartz
S. A. Thornton

INVENTOR
George F. Long.
BY
Messimer Austin
ATTORNEYS

UNITED STATES PATENT OFFICE.

GEORGE F. LONG, OF ELMHURST, NEW YORK, ASSIGNOR TO GOTTFRIED PIEL, OF NEW YORK, N. Y.

FLEXIBLE SHAFT.

1,192,914.  Specification of Letters Patent.  Patented Aug. 1, 1916.

Application filed May 19, 1914. Serial No. 839,501.

*To all whom it may concern:*

Be it known that I, GEORGE F. LONG, a citizen of the United States, and resident of Elmhurst, in the county of Queens and State of New York, have invented certain new and useful Improvements in Flexible Shafts, of which the following is a specification.

My invention relates to a flexible shaft or chain of general application and relates particularly to a light shafting adapted for use in connection with speedometers on automobiles or other vehicles.

One of the objects of this invention is to provide a cheap form of shaft having links pivoted to each other in order, which can withstand the torsional strains incidental thereto without distorting or affecting the pivotal connections between the links. To this end I form the chain of alternate one-piece shell links and relatively short connecting plate links. The shell links are stamped to shape from a blank of suitable sheet metal and the stamped blank is formed into a tubular member with meeting edges interlocking along a material portion of their lengths.

Another object of the invention is to provide a device of the above indicated character, the several parts of which are designed to be quickly assembled or dismounted and which are securely locked together when in use. For this purpose, I press bearings in the shell members adjacent their ends and connect the adjacent shells with a solid link having lateral pivot pins which are readily inserted into the bearings from the side opposite the adjacent end of the shell and are locked from an unseating movement off said bearings when the links are in prolongation of the adjacent shells.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

Figure 1:
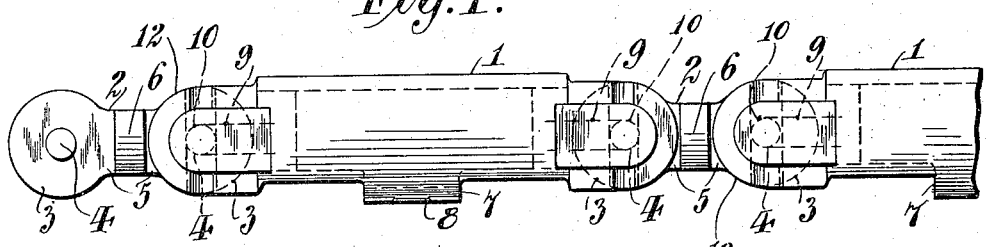
Figure 2:
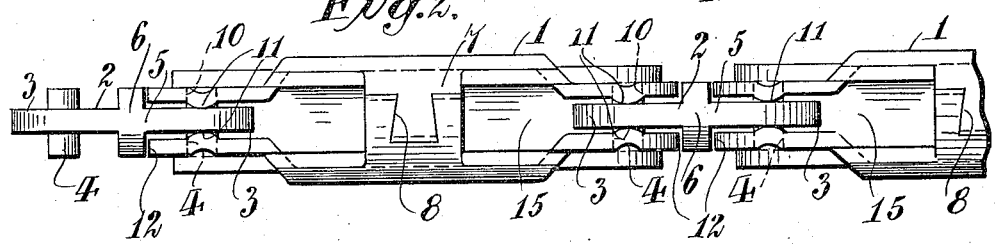
Figures 3, 5:
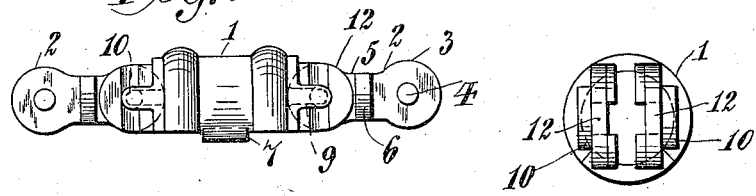
Figure 4:
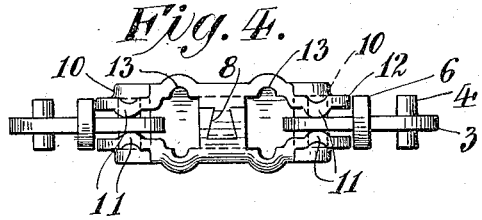
Figure 6:
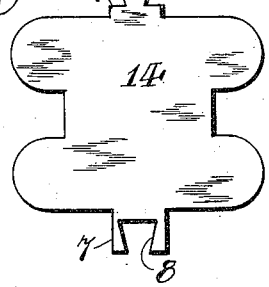

Referring to the accompanying drawings: Figure 1 is an elevation showing several links of my improved shaft connected together; Fig. 2 is a plan view of the bottom side of the device shown in Fig. 1; Figs. 3 and 4 are views similar respectively to Figs. 1 and 2 showing a slightly modified form of shell link; Fig. 5 is an end view of the shell link shown in Figs. 3 and 4; and Fig. 6 is a plan view of the blank before it is stamped to form the shell link.

In the drawings there is illustrated a shaft or chain formed of alternate shell links 1 and relative short solid plate links 2 pivoted together in order. Each link 2 comprises a plate, the end portions of which are formed of circular bearing members 3 having pivot pins or trunnions 4 projecting through the center on opposite sides thereof. The members 3 are connected by a relatively short web 5 reduced in width and having a stop or wall 6 projecting from opposite faces thereof parallel with the pins.

The shell links are of sheet metal stamped to shape and bent longitudinally upon themselves to form channel members. The longitudinal edges of each channel member has an extension 7, which extensions have suitable interlocking means, such as the dovetail joint 8, thereby to form the central portion of the member into a tube designed to resist twisting strains on the link. The side walls at each end of the channel members are provided interiorly with longitudinal grooves 9 which open into the interior of the channel member and terminate adjacent the ends of the link to form socket bearings 10 for the pins 4. These bearings are preferably spaced from the adjacent ends of the link a distance slightly less than the distance between the stop 6 and the pins 4 on the plate link.

The portions of the walls adjacent the bearings are preferably flattened and provided with inwardly projecting ribs 11 adapted to bear on the members 3 adjacent the pins to provide a broad engagement transversely of the lapping faces of the links to transmit twisting strains from one link to the next. The ends of the links are preferably rounded as shown at 12 to provide a bearing for the stop 6. The channel may be of a width sufficient to permit the insertion of the pins therein, as shown in Figs. 1 and 2, or the side walls of the channel may have transverse channels 13 communicating with the grooves 9 to form L- shaped passageways leading from the outside of the shell to the bearings 10 as shown in Figs. 3 and 4.

To construct the shell link, a blank 14, such as is shown in Fig. 6, is cut from a sheet of suitable metal and by means of suitable dies the same is first stamped to form the grooves and channels and is then bent longitudinally to form the channel members and finally the extensions are brought together and locked to form the tubular central portion.

To assemble the chain, the plate links are secured to the shell links by inserting the pivot pins or trunnions into the channel openings 15 between the tubular portion and the end walls, or through the transverse channels 13 and are then moved forwardly toward the adjacent end through the grooves 9 into engagement with the bearings 10. The plate link is then swung on said pivot pins until the links are in alinement with each other and with the stop 6 substantially filling the space between the adjacent ends of the shell links to prevent longitudinal movement between the links. Displacement of the links by rearward movement is thus prevented by the stop 6 coming in contact with the rounded end of the shell. When it is desired to detach the parts the plate link is again swung at substantially right angles to the shell which causes the stop 6 to clear the bearing surface of the shell and thus permits the plate link to be moved rearwardly until the pivot pins or trunnions are in the channel portion of the shell. By means of this construction the shell links may be stamped from sheet metal blanks and require no additional parts nor any machining of parts to form the bearings. By making the central portion of the shell of a continuity of metal, the possibility of distortion is minimized and the bearings are maintained in alinement. This construction provides for all of the advantages of a tubular form of connection and permits the use of a relatively thin gage of material. The ribs 11 provide a line contact between the engaging surfaces of the links thus reducing the friction at this point but at the same time provides an engagement transversely of the shaft to provide a broad bearing to take up twisting strains. This construction also permits a certain amount of rocking movement to the links with respect to each other so that the shaft may have some lateral play independent of any curvature of the shaft in a vertical plane.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. As an article of manufacture, an element adapted to form part of a flexible shaft, said element comprising a one-piece channel member, a portion of the longitudinal edges having interlocking means for forming a portion of the channel member into a tubular part, an end of said member having oppositely disposed walls and each of said walls having a socket stamped therein, said sockets together forming a bearing spaced from the adjacent end of the member and adapted to receive a coacting element of the shaft, said channel member providing an opening thereto between its tubular part and said end walls, said opening leading to said bearing whereby the bearing engaging portion of the coacting element may be inserted through said opening and then moved longitudinally of the element onto said bearing.

2. As an article of manufacture, an element of a flexible shaft, comprising a one-piece sheet metal tubular member, with certain portions continuous to form a closed tubular portion intermediate the length of the element, a bearing being formed in said member adjacent one end and opening into the interior thereof, said member having an opening in the side thereof between the closed tubular portion and the bearing, leading to said bearing.

3. As an article of manufacture, a sheet metal channel member adapted to form a link of a pivoted chain, said channel member having opposite walls pressed outward to form lateral channels facing each other and having longitudinal grooves communicating with said channels to form L-shaped depressions in said walls, the ends of the grooves opposite the channels forming bearings adapted to constitute part of the pivotal connections with the next adjacent element of the chain.

4. In a device of the class described, a shell member opposite ends of which have parallel walls with socketed bearings in said walls fixed relative to each other and adapted to form part of a pivotal connection with the next adjacent element of the device, the portion of the shell intermediate the walls being tubular thereby to prevent relative movement between said parallel walls when said walls are subjected to a twisting strain, said bearings having openings in the side thereof leading to said tubular portion of the shell.

5. In a device of the class described, a sheet metal channel member with the longitudinal edges having extensions intermediate their ends, said extensions projecting toward each other and formed into a dovetail joint constituting an interlocking means for permanently securing said extensions together, each end of said member having means stamped therein for demountably pivoting the member to the next adjacent member of the device without breaking the dove-tail joint.

6. In a device of the class described, the combination with a pair of one-piece substantially tubular shell links having their ends disposed in juxtaposition, each shell having an internal bearing, and a longitudinal groove leading to said bearing, and a plate link having trunnion pins mounted in said bearings and within the shells and having a flat plate disposed between and substantially filling the space between said juxtaposed ends of the shell links, said plate preventing said trunnion pins from moving rearwardly off their bearings, the distance between one of said trunnion pins and said flat plate being slightly greater than the distance between said groove and the adjacent outer surface of said link transversely of said groove whereby said plate link may be turned at right angles to its longitudinal position relative to the shell link and slid along said longitudinal groove to remove the plate link from the bearing at one end of the groove, and parts of said tubular members closing the ends of said bearings to engage and prevent longitudinal movement of said trunnion pins on said bearings.

7. As an article of manufacture, a one-piece sheet metal member having a tubular center portion and channel shaped portions forming continuations of opposite ends of the tubular portion, each wall of one of said channel shaped portions provided with socketed bearings spaced from the end thereof a distance greater than the thickness of the metal forming the member to form end bearing members, the inner ends of said bearings facing each other and each bearing having an inwardly facing opening in the side thereof adapted to permit the seating of a trunnion pin therein, which pin has been introduced into the channel portion between the bearings and the tubular center portion.

Signed at New York in the county of New York and State of New York this 15th day of May, A. D. 1914.

GEORGE F. LONG.

Witnesses:
JOHN Z. McCAW,
HARRY W. FANNING.

Copies of this patent may be obtained for five cents each, by addressing the "Commissioner of Patents, Washington, D. C."